Jan. 28, 1958   E. W. JAHN   2,820,997
SHELL MOLDING MACHINE
Filed June 22, 1956   5 Sheets-Sheet 1

INVENTOR.
EARL W. JAHN
BY Chapin & Neal
ATTORNEYS

INVENTOR.
EARL W. JAHN
BY Chapin & Neal
ATTORNEYS

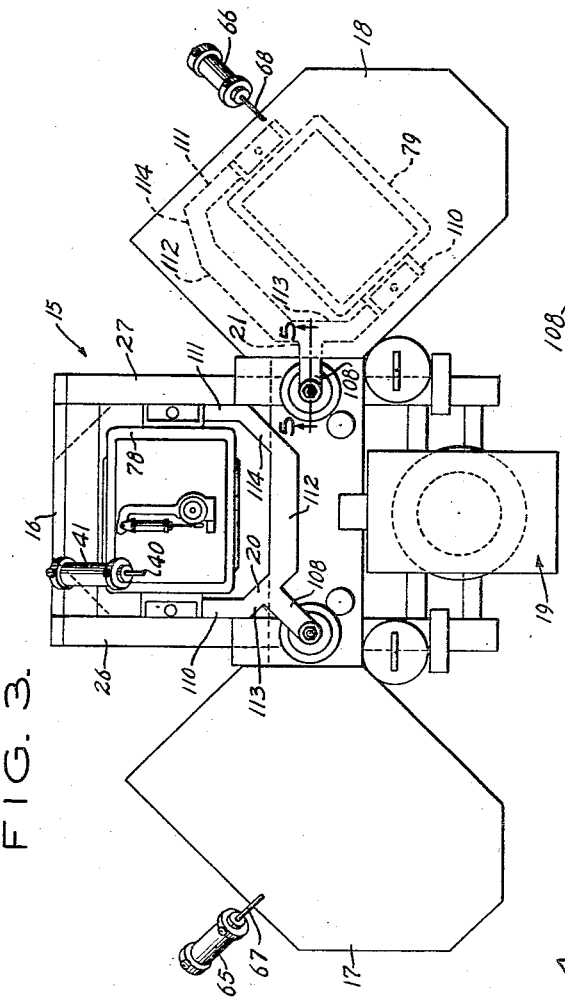
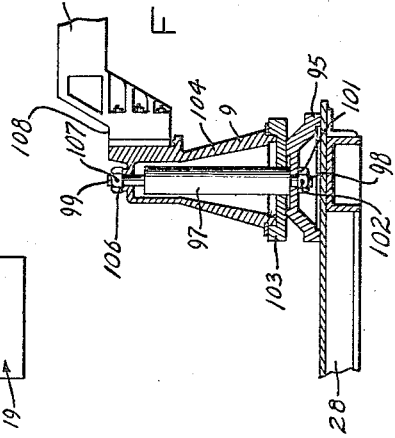
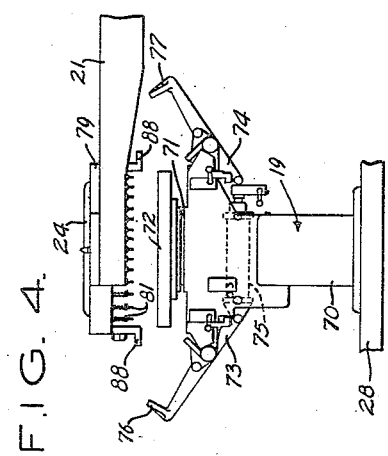
Jan. 28, 1958 — E. W. JAHN — 2,820,997
SHELL MOLDING MACHINE
Filed June 22, 1956 — 5 Sheets-Sheet 3
INVENTOR.
EARL W. JAHN
BY Chapin & Neal
ATTORNEYS Jan. 28, 1958 — E. W. JAHN — 2,820,997
SHELL MOLDING MACHINE
Filed June 22, 1956 — 5 Sheets-Sheet 4
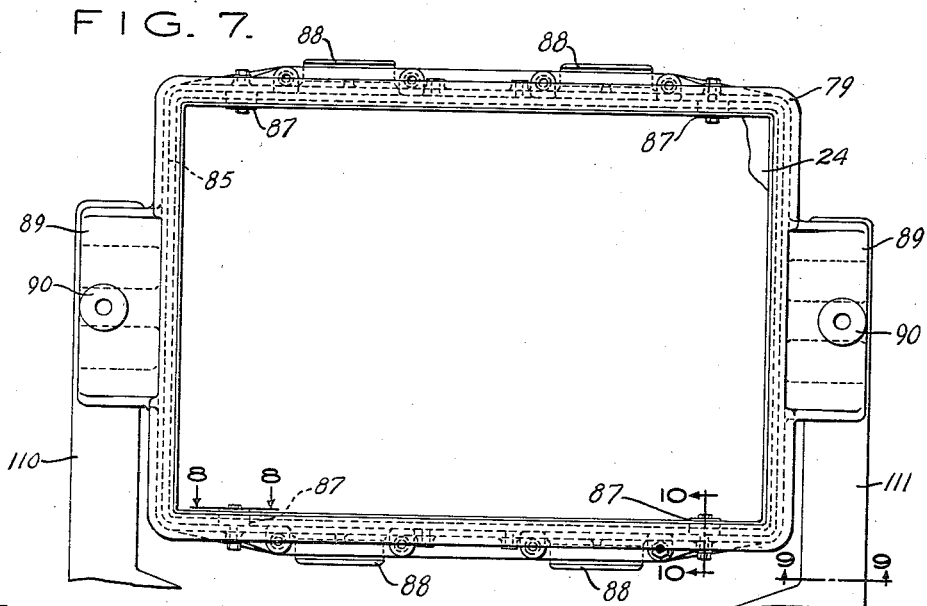
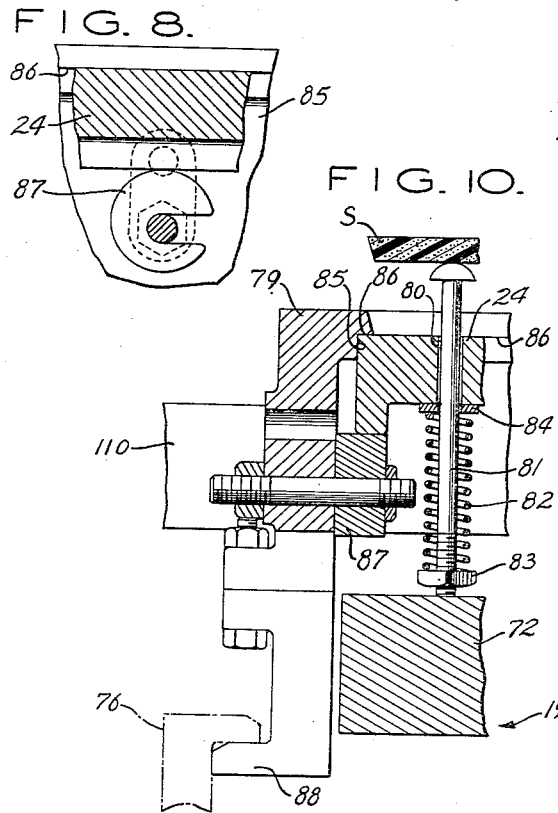
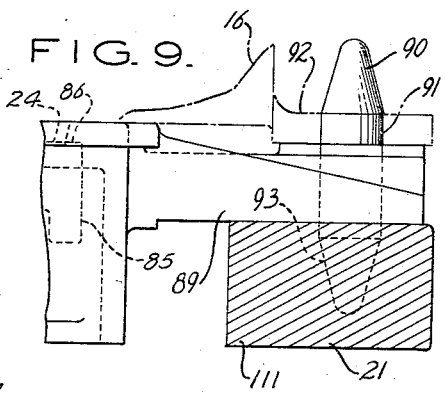
INVENTOR.
EARL W. JAHN
BY Chapin & Neal
ATTORNEYS

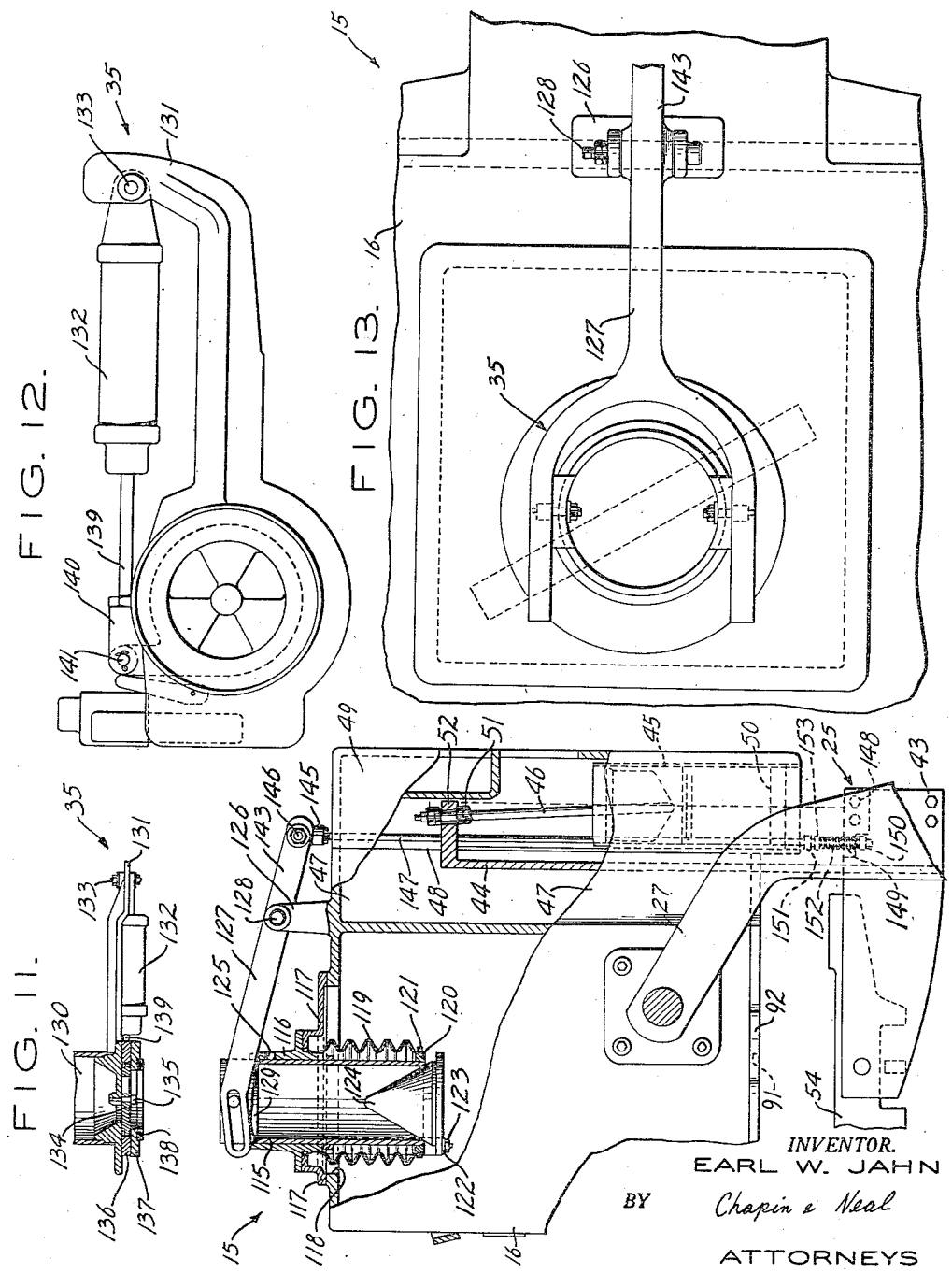

United States Patent Office 2,820,997
Patented Jan. 28, 1958

2,820,997

SHELL MOLDING MACHINE

Earl W. Jahn, Springfield, Mass., assignor to Production Pattern & Foundry Co., Chicopee, Mass., a corporation of Massachusetts Application June 22, 1956, Serial No. 593,068

10 Claims. (Cl. 22—20)

This invention relates to new and useful improvements in shell molding machines.

More particularly, the invention relates to a new machine for making shell molds of the type used in the shell molding process described by William W. McCulloch of the Technical Industrial Intelligence Division of the U. S. Department of Commerce in FIAT Report No. 1168 entitled "The 'C' Process for Making Molds and Cores for Foundry Use" and of the general type shown in the copending application of Jahn et al., Serial No. 340,622, filed March 5, 1953.

One object of the invention is to provide a shell molding machine which can produce shells at a greater capacity than conventional machines and can produce shells for two different jobs at the same time.

Another object of the invention is to provide a "twin" shell making machine having two ovens and with only a single investment box and shell ejector assembly but providing two complete sets of work stations so that patterns can be changed on either set of stations without interrupting production on the other set and without loss of production time in case of pattern trouble, the machine being able to run with both or either set of stations operative.

Still further, the invention proposes constructing the shell making machine with a pair of swiveled forked carriers to move two shell mold patterns separately and at different times under the investment box, into the ovens and over the shell ejection assembly so that a shell on one mold pattern can be baked or ejected while another shell is being formed on the other mold pattern.

In the drawings:

Fig. 3 is a plan view of the machine partly diagrammatic and with parts broken away;

Fig. 4 is a front elevational view of the ejector shown in Figs. 2 and 3 showing a fork (partly broken away) holding a carrier borne pattern over the ejector;

Fig. 5 is a fragmentary sectional view taken on line 5—5 of Fig. 3;

Fig. 7 is a top plan view of a pattern, carrier and portions of a carrier fork;

Fig. 8 is a sectional view taken on line 8—8 of Fig. 7;

Fig. 9 is a sectional view taken on line 9—9 of Fig. 7 and with the investment box indicated in dot-dash outline;

Fig. 10 is a sectional view taken on line 10—10 of Fig. 7 with an ejector clamp finger indicated in dot-dash outline;

Fig. 11 is a fragmentary view, partly broken away and in section, of the investment box and feed structure;

Fig. 12 is a top plan view of the cut-off gate for the feed structure; and

Fig. 13 is a fragmentary top plan view of the investment box and of part of the feed structure.

Figure 1:
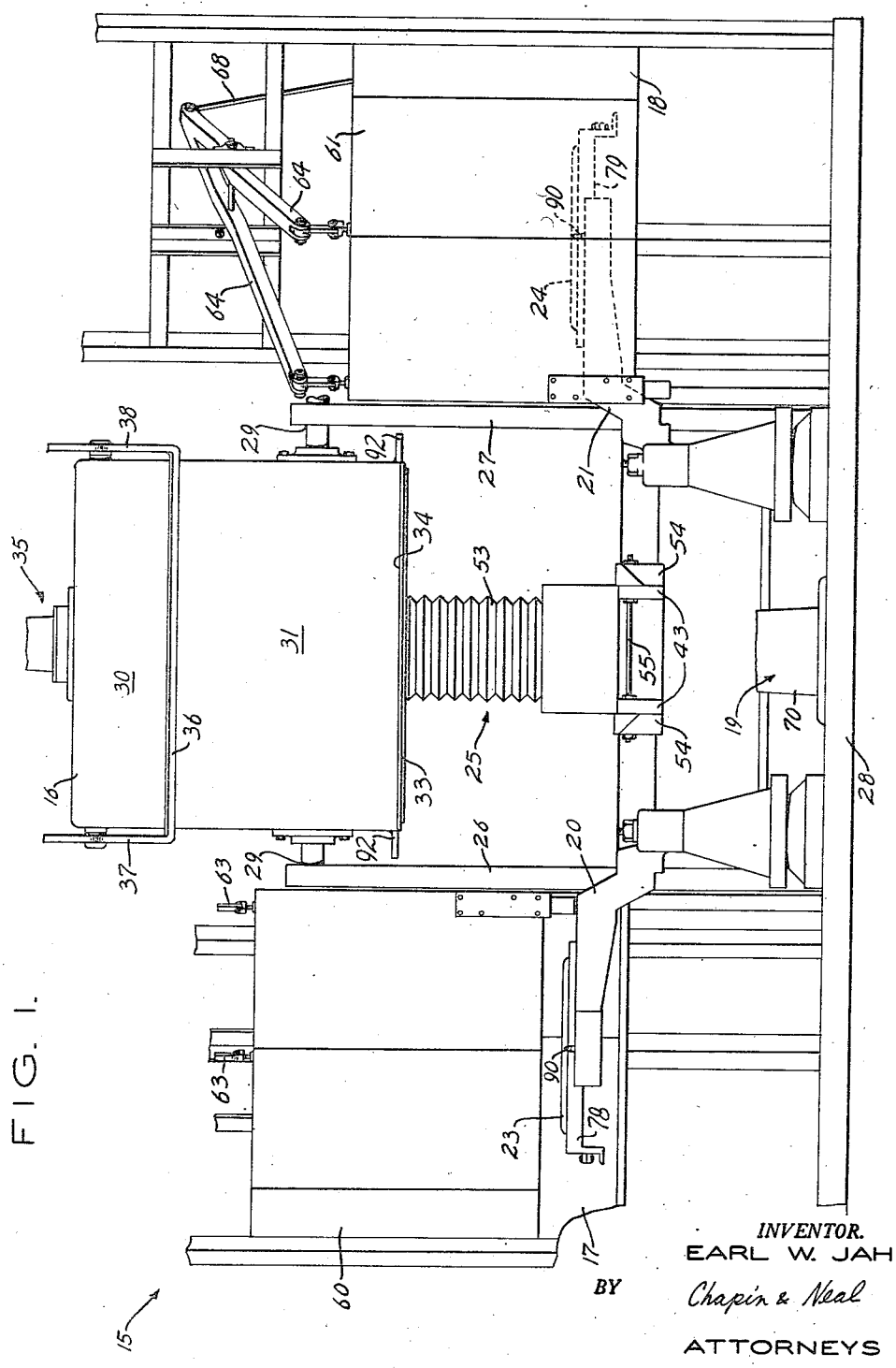
Fig. 1 is a front elevational view with parts broken away of a shell mold forming machine constructed and arranged in accordance with the present invention.

Referring more particularly to the drawings, the machine is designated generally in the drawings by the reference numeral 15. It has four principal assemblies or subassemblies and work stations: an investment box 16 (the investment station), two ovens 17 and 18 (pattern heating and shell baking or curing stations), and a shell ejector or ejector assembly 19 (the shell ejecting station).

In addition, the machine 15 has two pattern carrier forks 20 and 21 for moving mold patterns 23 and 24 to and between the work stations and an investment box clamping mechanism 25 for raising and lowering the mold patterns from the carrier forks 20 and 21 and clamping them to the investment box.

Investment box 16 is pivotally mounted between spaced upright posts or standards 26 and 27 which are secured to a ship channel frame or base 28. The investment box has trunnions or axle members journaled on the posts 26 and 27 as at 29 and fixed at opposite sides to the lower rear portion of the box for holding the box upright, and for turning it upside down and right side up. Any suitable electric gear head or hydraulic motor or electric motor and drive may be used to turn the trunnions or axles and the box, such as, for example, the electric motor and cable drive shown in the copending application referred to above.

An upper compartment 30 (Fig. 2) and a lower compartment 31 are provided in the investment box 16 with a louver or gate 32 separating the two compartments. The lower compartment 31 has an open lower end over which a carriage borne mold pattern 23 or 24 is clamped by the clamping mechanism 25 as will later be more fully described. A sand-resin mix is initially held in the upper compartment 30 of the box 16 by louver or gate 32 and dropped vertically on opening of the louver onto the hot surface of a pattern clamped over the open lower end of lower box compartment 31 to insure dense shells and avoid metal penetration of the shell walls in molding with the shells.

The open lower end of the lower compartment 31 of box 16 is framed by an adapter 33 secured to an adapter rim plate 34 so as to provide an opening appropriate to the dimensions of the pattern plate and size shell desired. A feed assembly 35 is provided at the top of the upper compartment 30 of the box for refilling the supply of sand-resin investment material in the upper compartment when the box is upright.

Louver or gate 32 is arcuate in shape with edges slidably held at each inner side wall of the investment box by suitable guideway structure. A strap 36 fixed across the outer edge of the gate has end portions which extend laterally of the sides of the box and are attached to the outer end of lever arms 37 and 38. These lever arms 37 and 38 are pivotally connected to the box adjacent the upper rear portion of the side walls of the box.

Figure 2:
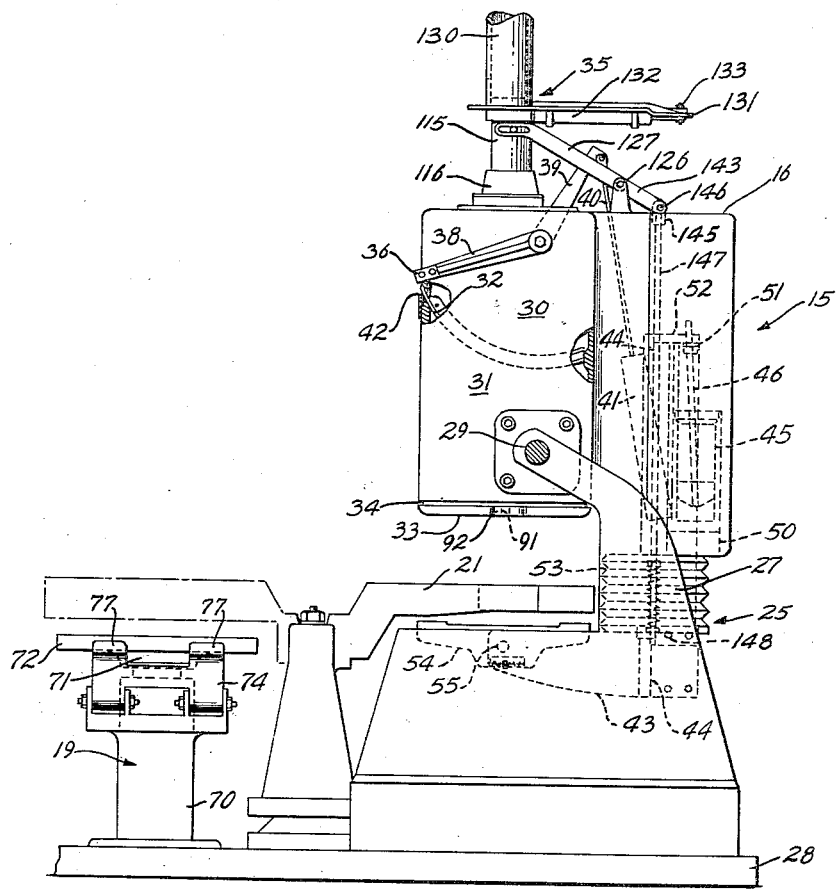
Fig. 2 is a side elevational view of the structure shown in Fig. 1 but with the ovens omitted.

Lever arm 37 has an upwardly angled and inwardly offset bell crank end 39 (Fig. 2). The piston rod 40 of a cylinder 41 secured to the investment box is pivotally connected with the bell crank end 39 of lever arm 37 to operate the gate or louver. Piston rod 40 in extended position holds the louver or gate 32 closed and in retracted position opens the louver by withdrawing it from the box through the louver opening at 42.

Clamping means or mechanism 25 is provided on the investment box 16 for raising and lowering a carriage borne pattern 23 or 24 from a carrier fork 20 or 21 and holding it against the open end of the investment box.

The clamping mechanism comprises a pair of spaced castings 43 fixed to the lower end of a channel 44 (Figs. 2 and 11) with a cylinder and piston rod 45 and 46 to move the channel vertically. Cylinder 45 and channel 44 are housed in a U-shaped column support 47 integral with the rear wall of the investment box 16. Suitable guides or gibs are provided for the channel and an oppositely faced U-shaped outer housing support 49 is fixed to the support 47, the dividing line between supports 47 and 49 being at 48.

Figure 6:
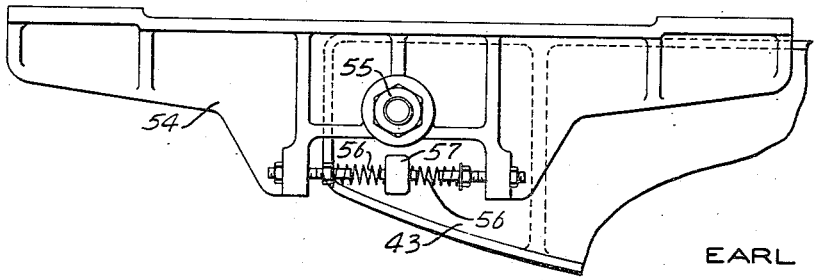
Fig. 6 is an enlarged view of a part of the clamping mechanism for raising, lowering and clamping a carrier borne pattern to the investment box.

The cylinder 45 is mounted on a horizontal bracket 50 and vertically disposed with the piston rod 46 extending upwardly. Adjustable nuts 51 provide a seat for a horizontal lifter plate 52 extending as a web at right angles from the top of the channel 44. Bellows 53 extend between the cylinder 45 and base of the channel 44 to provide a dust cover for the channel. A pair of horizontal clamp arms 54 (Fig. 6) are pivotally and resiliently mounted on a rod 55 extending across the spaced castings 43 by spaced springs 56 bearing against projections 57 from the spaced castings 43 to lift a carriage borne pattern plate from a carrier fork as the piston rod 46 raises the channel 44 and the castings 43 secured thereto.

The ovens are located as follows: oven 17 is at the left and is positioned to the left front of the investment box and the machine, as the machine is viewed in Fig. 1. Oven 18 is at the right and is positioned to the right front of the investment box. The ovens are identical in construction and may be made for any type of heat, such as oil, gas or electricity. Both ovens are polygonal in shape and have doors 60 and 61 which are opened and closed by levers 63 and 64 (Fig. 1). Fixed pistons 65 and 66 (see Fig. 3) with piston rods 67 and 68 are provided to open and close the oven doors. Piston rod 67 is connected with lever 63 for the left oven door and piston rod 68 is connected with lever 64 for the right oven door.

The ejector is located between the two ovens 17 and 18 and in front of the investment box. The ejector 19 comprises a cylinder pedestal 70 having a piston rod 71 to which is fixed a platen 72. Spaced pattern carriage holding clamps 73 and 74 (Fig. 4) are pivotally mounted on opposite sides of the pedestal. The clamps 73 and 74 are operated by a piston and cylinder 75 and have finger portions 76 and 77 which removably clamp at the sides of a carrier fork 20 or 21 and hold a pattern carriage 78 or 79. The patterns 23 and 24 around their periphery have spaced oversize holes 80 (Fig. 10) in which are slidably mounted carriage bolt ejection pins 81 fitted with a spring 82, nut 83 and washer 84. When a carriage borne pattern is held over the ejection station by one of the forks 20 or 21 after leaving one of the curing ovens, the ejector piston rod 71 and ejector platen 72 raise the ejection pins 81 to strip a cured shell "S" from the pattern.

The pattern carriages or carriage frames 78 and 79 which hold patterns 23 and 24 are identical in construction each having a central pattern opening 85 (see Figs. 7 to 10, inclusive) and a top inner flange 86 so that a pattern can be inserted from the bottom or back of the carriage and the marginal edge of the pattern abutted against the flange 86. Cam members 87 are pivotally mounted on the carriages to abut against the bottom of a pattern to hold a marginal peripheral portion of the face of the pattern against the flange 86 of a carriage. Spaced finger clamp brackets 88 are provided on opposite sides of a carriage at the bottom or rear of the carriage for the finger portions 76 and 77 of ejector clamps 73 and 74 to move over and prevent the carriage and pattern from rising when the ejector piston platen 72 raises and lifts the shell ejection pins 81 of the pattern. Also provided on the carriages are spaced end flanges 89 with vertically disposed double pointed tapered alignment pins 90. The upper points of the pins 90 are adapted removably to fit in spaced pin openings 91 on bracket flanges 92 of the investment box located at the lower open end of the box. The lower points of the alignment pins 90 are adapted removably to fit in alignment pin openings 93 provided in the carrier forks 20 and 21.

The carrier forks 20 and 21 are identical in construction. Each has a base portion 95 (see Fig. 5) fixed to the channel base 28 of the machine between the box 16, ovens 17 and 18 and ejection assembly 19. The base portion of fork 20 is located between the left oven 17, box 16 and ejection assembly 19 and the base portion of fork 21 is located between the right oven 18, box 16 and the ejection assembly.

Mounted on each carrier fork base portion 95 is a shaft 97 having threaded turned down ends 98 and 99, the end 98 extending through a central opening in the base portion and secured by a nut 101 and pin 102. A drive gear 103 fits over the base portion and a cylindrical sleeve 104 is mounted on the gear and over the shaft 97. Each sleeve 104 has an upper end opening through which the upper threaded turned down end 99 of a shaft 97 extends and is secured by nut 106 and pin 107. Hand tightening of the nut 106 will eliminate end play of the sleeve and allow free movement of the swivel.

The shank portions 108 of the forks 20 and 21 are fixed to the sleeves 104. Each fork 20 and 21 has two spaced fingers, arms or tynes 110 and 111 (see Fig. 3) connected at their rear ends by a cross portion or back 112. The backs or cross portions 112 in turn have angular ends 113 and 114 and the shank portions 108 extend perpendicularly from one of the angular ends.

The alignment pin openings 93 of the carriers (Fig. 9) are provided on the fingers or tynes of each fork and will align with the openings 91 in the brackets 92 at the bottom of the investment box when a fork is squarely under the investment box. This permits a carriage on the fork to be lifted from the fork and clamped to the investment box, the double headed pins being lifted as the carriage is lifted from the openings 93 in the forks to the openings 91 in the investment box brackets 92.

Each fork 20 and 21 holds a carriage or carriage frame which in turn holds one of the patterns. The two forks are so pivoted that they can each move rearwardly into an oven, forwardly or rearwardly over the ejection platen and ejector assembly, and under the investment box with fork fingers disposed to the sides of the elevator or pattern clamp 25. This permits the elevator or pattern clamp 25 mounted on the back of the investment box to operate between the fingers without any obstruction.

It will be apparent that two complete sets of work stations are provided. One set of work stations is reached by the left fork 20 so that a pattern can be preheated in the left oven, moved under the investment box, clamped to the investment box, coated with a shell, removed from the investment box and carried back to the left oven for curing and then moved to the ejection station where the cured shell can be removed and the steps repeated. The other set of work stations are reached by the right fork so that a pattern can be preheated in the right oven, moved under the investment box, clamped to the box, coated with a shell, removed from the box and carried back to the right oven for curing and then moved to the ejection station for removal of the cured shell. The right fork can be holding a pattern in the right oven or over the ejection station while the left fork has moved its pattern under the investment box. Similarly the left fork can operate while the right fork is under the investment box. The two forks can thus either operate together or separately so that in the event one must be inoperative because of pattern trouble there can still be production on the other fork.

The sand-resin feed assembly 35 for refilling the investment box has a sliding tube 115 (see Figs. 11, 12 and 13) slidably mounted in a tube guide 116 which is mounted on an adapter 117 secured to the top of the investment box at a top door or opening 118 in the box. A flexible dust shield or bellows 119 encircles the tube 115 between the lower end of the tube and the tube guide 116, being secured at one end to the tube guide and at the other end to the lower end of the tube by a ring 120 and buckle 121. A valve strap 122 secured by a bolt 123 to the investment box inside the box holds a conical valve 124 at the lower end of the tube 115 extending into the tube to spread the sand-plastic mix entering the investment box. A vent 125 is provided in the tube guide 116.

Mounted on top of the investment box outside the box is a fulcrum bracket 126 to which a yoke lever 127 is pivotally secured by a shaft 128. The forked end of the yoke lever 127 is connected with the upper end of the sliding tube 115 for raising and lowering the tube, a pair of trunnion-like cam followers being secured to the upper end of the tube 115 and the forked end of the yoke lever being provided with cam slots or surfaces for such action. A dust retainer 129 is also provided at the upper end of the tube 115.

The main supply feed pipe 130 from a hopper or other source of supply is above and axially aligned with the tube 115 when the investment box is in upright position. A cylinder support casting 131 is fixed to the open lower end of the feed pipe 130 and an air cylinder 132 is pivotally secured at one end by a clevis pin 133 to the support casting 131. A gate 134 (Fig. 11) is also pivotally secured to the casting 131 and aligned with the inside of the feed pipe 130 by a shoulder screw 135. A gate spacer 136 is provided beneath the casting 131 with a gasket mount 137 and gasket 138 tightly to receive the upper end of the tube 115 when it is raised. The piston rod 139 of the air cylinder 132 is connected with the gate 134 by a clevis 140 (Fig. 12) and clevis pin 141 so that the gate can be opened and closed by actuating the piston rod.

Yoke lever 127 has at its rear end a lever arm 143. The lever arm 143 is pivotally attached to a brake yoke 145 by a clevis pin 146. A rod 147 is secured at one end to the brake yoke 145 and slidably connected at the other end with a bracket 148 fixed to one of the castings 43 of the investment box clamping mechanism 25. Bracket 148 has a rod opening 149 through which the rod 147 extends and a collar 150 fits on the end of the rod beneath the bracket. A jam nut 151 is provided on the rod spaced from the bracket 148 above the bracket. Between the nut 151 and the bracket, a spring 152 encircles the rod and is secured at its upper end to the rod by a set screw collar 153. In this manner the sliding tube 115 is raised as the investment box clamp is lowered and the tube lowered as the clamp is raised.

What is claimed is:

1. A shell molding machine comprising in combination, a single pivotally mounted investment box; a pattern heating and mold curing oven on either side of said box; a shell mold ejector; and two pattern carriers swingable in a horizontal plane about fixed spaced centers; said box, one of said ovens and said ejector being angularly spaced about one of said centers to receive in operative relation a pattern carried by one of said carriers; said box, the other of said ovens and said ejector being angularly spaced about the other of said centers to receive in operative relation a pattern carried by the other of said carriers.

2. A shell molding machine comprising in combination, a single pivotally mounted investment box; a pattern heating and mold curing oven on either side of said box; a shell mold ejector; and two pattern carriers pivotally mounted for movement in a horizontal plane about fixed vertical spaced posts; said box, one of said ovens and said ejector being angularly spaced about one of said posts to receive in operative relation a pattern carried by one of said carriers; said box, the other of said ovens and said ejector being angularly spaced about the other of said centers to receive in operative relation a pattern carried by the other of said carriers; the outer under surfaces of said carriers being spaced above the tops of the vertical posts whereby each carrier may be swung from its adjacent oven, over the ejector, over the post of the other carrier and beneath said box when the other carrier is in its adjacent oven.

3. A shell molding machine comprising in combination, a single pivotally mounted investment box; a pattern heating and mold curing oven on either side of said box; a shell mold ejector; and two pattern carriers each having U-shaped forked portions and pivotal mountings affording movement of said carriers in a horizontal plane about fixed vertical spaced posts; said box, one of said ovens and said ejector being angularly spaced about one of said posts to receive in operative relation a pattern carried by one of said carriers; said box, the other of said ovens and said ejector being angularly spaced about the other of said centers to receive in operative relation a pattern carried by the other of said carriers; said pivotal carrier mountings being connected to the respective forked portions of the carriers at one side thereof; the outer under surfaces of said carriers being spaced above the tops of the vertical posts whereby each carrier may be swung from its adjacent oven, over the ejector, over the post of the other carrier and beneath said box when the other carrier is in its adjacent oven.

4. A shell molding machine comprising in combination, a single pivotally mounted investment box; a pattern heating and mold curing oven on either side of said box; a shell mold ejector; two pattern carriers swingable in a horizontal plane about fixed spaced centers; said box, one of said ovens and said ejector being angularly spaced about one of said centers to receive in operative relation a pattern carried by one of said carriers; said box, the other of said ovens and said ejector being angularly spaced about the other of said centers to receive in operative relation a pattern carried by the other of said carriers; a clamping member movably mounted on the box to raise and lower a pattern from and to the fork and clamp the pattern to the box; a cylinder and piston mounted on the box and connected with the clamping member to raise and lower the clamping member; said box having a top feed opening; a feed tube slidably mounted in the top feed opening of the box; a feed gate adapted to be mounted on a feed supply conduit over the feed tube; and linkage means connecting the feed tube with the clamping member to raise the feed tube to the feed gate when the clamping member is lowered and lower the feed tube from the feed gate when the clamping member is raised.

5. A shell molding machine comprising in combination, a pivotally mounted investment box, a pattern heating and mold curing oven at one side of the box with a door opening angularly disposed from the box, a shell mold ejector adjacent the oven at another side of the box for stripping cured shell molds from patterns, a pattern carrier fork pivotally mounted between the box, oven and ejector and pivotable under the box, in and out of the oven through the door opening, and over the ejector, and clamping means to raise and lower a pattern from and back onto the fork and clamp the pattern to the box.

6. A shell molding machine comprising in combination, a pivotally mounted investment box, a pattern heating and mold curing oven at one side of the box with a door opening angularly disposed from the box, a shell mold ejector adjacent the oven at another side of the box for stripping cured shell molds from patterns, a pattern carrier fork having spaced arms and a shank swivelably mounted between the box, oven and ejector and pivotable under the investment box, in and out of the oven and over the ejector, and a clamping member movably mounted on the box to raise and lower a pattern from and to the fork and clamp the pattern to the box, said fork arms straddling the clamping member for free movement of said member between the arms when the fork is under the box and spaced from and to the sides of said member when the box is pivoted.

7. A shell molding machine comprising in combination, a pivotally mounted investment box, a pattern heating and mold curing oven at one side of the box with a door opening angularly disposed from the box, a shell mold ejector adjacent the oven at another side of the box for stripping a cured shell mold from a pattern plate, a pattern plate carrier fork swivelably mounted between the box, oven and ejector, said fork having a shank and spaced arms each free at one end and pivotable under the box, into the oven and over the ejector, a pattern plate clamping member movably mounted on the box to raise and lower a pattern plate from and to the fork and clamp the plate to the box, said fork arms being disposed at the sides of said member when the fork is under the box and when the box is pivoted, and registrable means on the fork and box to position the fork under the box and align said clamping member with a pattern on the fork.

8. A shell molding machine comprising in combination, a pivotally mounted investment box, a pattern heating and mold curing oven at one side of the box with a door opening angularly disposed from the box, a shell mold ejector adjacent the oven at another side of the box for stripping a cured shell mold from a pattern plate, a pattern plate carrier fork swivelably mounted between the box, oven and ejector, said fork having a shank and spaced arms each free at one end and pivotable under the box, into the oven and over the ejector, a pattern plate clamping member movably mounted on the box to raise and lower a pattern plate from and to the fork and clamp the plate to the box, said fork arms being disposed at the sides of said member when the fork is under the box and when the box is pivoted, and registrable means on the fork and box to position the fork under the box and align said clamping member with a pattern on the fork, said clamping member having a vertical arm and a horizontal plate pivotally mounted on the vertical arm, and spring means resiliently to hold the horizontal plate horizontal on the vertical arm.

9. A shell molding machine comprising in combination a pivotably mounted investment box, a pattern heating and mold curing oven at one side of the box with a door opening angularly disposed from the box, a shell mold ejector adjacent the oven at another side of the box for stripping cured shell molds from patterns, a pattern carrier fork having spaced arms and a shank swivelably mounted between the box, oven and ejector and pivotable under the investment box, in and out of the oven and over the ejector, a clamping member movably mounted on the box to raise and lower a pattern from and to the fork and clamp the pattern to the box, a cylinder and piston mounted on the box and connected with the clamping member to raise and lower the clamping member, said box having a top feed opening, a feed tube slidably mounted in the top feed opening of the box, a feed gate adapted to be mounted on a feed supply conduit over the feed tube, and linkage means connecting the feed tube with the clamping member to raise the feed tube to the feed gate when the clamping member is lowered and lower the feed tube from the feed gate when the clamping member is raised.

10. A shell molding machine comprising in combination a pivotally mounted investment box, a pair of pattern heating and mold curing ovens substantially opposed and with door openings angularly disposed from the box one oven at one side of the box and the other oven at another side of the box, a shell mold ejector between the ovens and in front of the box, a pair of carrier forks, one of said forks being swivelably mounted between the box, ejector and one oven and pivotable under the box, into the oven and over the ejector and the other fork being swivelably mounted between the box, ejector and other oven and pivotable under the box, over the ejector and into the other oven, a clamping member movably mounted on the box to raise and lower patterns from and to the forks and clamp them to the investment box, a cylinder mounted on the box and having a piston connected with the clamping member to raise and lower the clamping member, said box having a top feed opening, a feed tube slidably mounted in the top feed opening of the box, a feed gate adapted to be mounted on a feed supply conduit over the feed tube, and linkage means connecting the feed tube with the clamping member to raise the feed tube to the feed gate when the clamping member is lowered and lower the feed tube from the feed gate when the clamping member is raised.

References Cited in the file of this patent

UNITED STATES PATENTS

| 1,570,658 | Wickland | Jan. 26, 1926 |
| 1,925,890 | Wilberz | Sept. 5, 1933 |
| 2,630,608 | Granath | Mar. 10, 1953 |
| 2,724,158 | Davis et al. | Nov. 22, 1955 |
| 2,724,879 | Fischer | Nov. 29, 1955 |
| 2,733,489 | Dahmer | Feb. 7, 1956 |

FOREIGN PATENTS

| 512,537 | Canada | May 3, 1955 |
| 728,108 | Great Britain | Apr. 13, 1955 |
| 733,184 | Great Britain | July 6, 1955 |